United States Patent
Edwards

(10) Patent No.: US 11,024,097 B2
(45) Date of Patent: *Jun. 1, 2021

(54) SYSTEM AND METHOD FOR USING AUGMENTED REALITY TO VISUALIZE NETWORK SERVICE QUALITY

(71) Applicant: PCMS Holdings, Inc., Wilmington, DE (US)

(72) Inventor: Keith Edwards, Atlanta, GA (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,081

(22) Filed: May 27, 2020

(65) Prior Publication Data

US 2020/0286297 A1    Sep. 10, 2020

Related U.S. Application Data

(63) Continuation of application No. 16/566,556, filed on Sep. 10, 2019, now Pat. No. 10,692,296, which is a
(Continued)

(51) Int. Cl.
*G06T 19/00*        (2011.01)
*G06T 19/20*        (2011.01)
(Continued)

(52) U.S. Cl.
CPC ........ *G06T 19/006* (2013.01); *G01C 21/3626* (2013.01); *G06F 3/011* (2013.01);
(Continued)

(58) Field of Classification Search
None
See application file for complete search history.

(56) References Cited

U.S. PATENT DOCUMENTS 8,086,245 B2    12/2011    Karaoguz
8,140,364 B2    3/2012    Kannan
(Continued)

FOREIGN PATENT DOCUMENTS

EP    1639851 B1    3/2006
EP    2950181 A1    12/2015
(Continued)

OTHER PUBLICATIONS

Written Opinion of the International Preliminary Examining Authority for PCT/US2016/061378 dated Oct. 10, 2017.
(Continued)

*Primary Examiner* — Michelle Chin
(74) *Attorney, Agent, or Firm* — Invention Mine LLC

(57) ABSTRACT

The quality of service one may expect from a given network is often hard to determine in advance. Further, given agreements between network service providers and a variety of content providers, the complexity inherent in selecting a given available network is increasing for consumers. Embodiments described herein provide mechanisms for creating an augmented reality presentation of networks and the service quality of those networks. The presentation may display information regarding a variety of factors including content transit agreements with content providers, quality-of-service or prioritization guarantees for certain types of content, or low-level Wi-Fi signal quality. These presentations allow users to ascertain where in a given spatial area good quality is available for whichever services they intend to use.

20 Claims, 10 Drawing Sheets

Related U.S. Application Data continuation of application No. 15/775,775, filed as application No. PCT/US2016/061378 on Nov. 10, 2016, now Pat. No. 10,424,120.

(60) Provisional application No. 62/256,566, filed on Nov. 17, 2015.

(51) Int. Cl.

| | | |
|---|---|---|
| *G06F 3/01* | (2006.01) | |
| *G06F 3/0481* | (2013.01) | |
| *G06Q 10/06* | (2012.01) | |
| *G06Q 30/02* | (2012.01) | |
| *G01C 21/36* | (2006.01) | |

(52) U.S. Cl.
CPC ....... *G06F 3/04815* (2013.01); *G06Q 10/063* (2013.01); *G06Q 30/02* (2013.01); *G06Q 30/0277* (2013.01); *G06T 19/20* (2013.01); *G06T 2219/2012* (2013.01)

(56) References Cited

U.S. PATENT DOCUMENTS

| | | | |
|---|---|---|---|
| 8,978,105 | B2 | 3/2015 | Gast |
| 9,148,823 | B2 | 9/2015 | Forssell |
| 9,589,372 | B1 | 3/2017 | Bean |
| 2003/0229478 | A1 | 12/2003 | Rappaport |
| 2005/0228860 | A1 | 10/2005 | Hamynen |
| 2007/0162942 | A1 | 7/2007 | Hamynen |
| 2009/0289956 | A1 | 11/2009 | Douris |
| 2010/0242079 | A1 | 9/2010 | Riedl |
| 2012/0122514 | A1 | 5/2012 | Cheng |
| 2012/0147040 | A1 | 6/2012 | Yun |
| 2014/0055490 | A1 | 2/2014 | Mule |
| 2014/0195606 | A1 | 7/2014 | Krishnamurthy |
| 2015/0052247 | A1 | 2/2015 | Threefoot |

FOREIGN PATENT DOCUMENTS

| | | |
|---|---|---|
| EP | 2983138 A1 | 2/2016 |
| WO | 2011126945 | 10/2011 |

OTHER PUBLICATIONS

International Preliminary Report on Patentability for PCT/US2016/061378 completed on Feb. 7, 2018.
Lamarca, A., et al. "Place lab: Device positioning using radio beacons in the wild." Pervasive computing. Springer Berlin Heidelberg, 2005. Available at: http://www.kevinli.net/courses/mobilehci_w2013/papers/placelab.pdf.
Guttman, A., "R-Trees: A Dynamic Index Structure for Spatial Searching" Proceedings of the 1984 ACM SIGMOD International Conference on the Management of Data.
Riww, "osmino Wi-Fi: free WiFi". Android Apps on Google Play, available at: https://web.archive.org/web/20150411060045/https://play.google.com/store/apps/details?hl=en&id=com.osmino.wifil, Web Archive dated: Apr. 7, 2015, 9 pages.
Velayos, H. et. al., "Requirements for network services in Brain project1". Available at: http://www.ee.columbia.edu/~alberto/publications/BRAIN2000.pdf.
"AirMagnet AirMapper™ App", available at: http://www.flukenetworks.com/enterprise-network/wireless-network/AirMagnet-AirMapper, (2015), 17 pages.
Osmino, "Osmino—Free hotspot finder with Augmented Reality". Wikitude, Web Archive dated Sep. 6, 2015, available at: https://web.archive.org/web/20150906203512/https://www.wikitude.com/showcase/osmino-find-free-htspots-with-augmented-reality/, 2 pages.
Kendrick, J., "Lookator: Android Hotspot Detector Using AR". Gigaom, available at: https://gigaom.com/2010/11/05/lookator-android-hotspot-detector-using-ar/, Nov. 5, 2010.
Notification of Transmittal of the International Search Report and the Written Opinion of the International Searching Authority, or the Declaration for PCT/US2016/061378 dated Jan. 23, 2017, 14 pages.
Wise, Knight, "Wigle—Wifi Hotspots Map". Youtube, published on Aug. 7, 2013, retrieved from: URL:https://www.youtube.com/watch?v=w3S7yLGNjNo, retrieved on Jan. 12, 2017, clips 6:02-6:20, 12:20-14:20, 17:40-17:55, 1 page.

SYSTEM AND METHOD FOR USING AUGMENTED REALITY TO VISUALIZE NETWORK SERVICE QUALITY

CROSS-REFERENCE TO RELATED APPLICATION

The present application is continuation of U.S. patent application Ser. No. 16/566,556, filed on Sep. 10, 2019, which is a continuation of Ser. No. 15/775,775, filed on May 11, 2018, which is a national stage application under 35 U.S.C. 371 of International Application No. PCT/US2016/061378, entitled "SYSTEM AND METHOD FOR USING AUGMENTED REALITY TO VISUALIZE NETWORK SERVICE QUALITY," filed on Nov. 10, 2016, which claims benefit under 35 U.S.C. § 119(e) from U.S. Provisional Patent Application Ser. No. 62/256,566, entitled "SYSTEM AND METHOD FOR USING AUGMENTED REALITY TO VISUALIZE NETWORK SERVICE QUALITY," filed Nov. 17, 2015, all of which are hereby incorporated by reference in their entirety.

BACKGROUND

Users increasingly access a variety of both paid and unpaid network services via a variety of network access point providers. For example, a library may provide a wireless network access point that a visitor can use to listen to streaming music, or a café may provide a wireless network access point that a customer can use to view streaming video. A variety of factors determine the overall quality of the experience that these consumers receive. These factors have effects at all layers of the networking stack. For example, at the physical layer, factors include Wi-Fi received signal strength (RSS) and channel crowding, or 4G signal strength. At the network layer, the factors include jitter, latency, and overall bandwidth. At the application layer, different service benefits may be available to customers of and/or visitors to particular establishments. With the variety of factors that can influence a user's online experience, it can be difficult for users to make informed decisions on where to go to find a network access point that meets their needs.

SUMMARY

Systems and methods described herein provide users the ability to locate wireless network access points that may provide high-quality services desired by the users, whether based on performance, cost, or other factors. Some embodiments of the disclosed systems and methods provide the ability for users to locate these networks in context, based on their own current location and needs.

Exemplary embodiments described herein allow end-user consumers to discover locations where the end user may receive a desired level of service for a given content provider. This process is facilitated by an Augmented Reality (AR) presentation that allows the user to scan his or her spatial environment and to see graphical indicators of the quality of service that a user may expect in certain regions overlaid on the user's view of the real environment.

In some embodiments, different graphical indicators may be used for different indications for signal quality. For example, color may be used to indicate overall network quality (e.g. red indicates poor reception, while green indicates exceptional reception), while level of opacity may indicate cost (solid regions may indicate free service, while translucent regions may indicate that users have to pay). Additional graphical indicators, such as icons, may represent different services (e.g., a service logo on an area where a streaming video service has a partnering relationship with a network service provider, for instance, or a star rating for crowd-sourced ratings of particular networks). A variety of such mappings are available in different embodiments. The displayed information allows users to quickly scan the area around them to identify areas in which they are likely to receive improved quality of service.

In some embodiments, a method is performed by an augmented reality display device. In an exemplary method, the device determines its location. Using the determined location, the device retrieves a record of at least a first proximate network access point, wherein the retrieved record identifies (i) at least one service benefit provided by a first content provider at the first network access point and (ii) a first region in which a signal from the first access point is expected to be available. The device displays at least a first graphical overlay registered to the first region, with the first graphical overlay including an indication of the service benefit.

In some such embodiments, a step is performed of determining whether at least a portion of the first region is within a current field of view of the augmented reality display device, wherein the displaying of the first graphical overlay is performed only after a determination that at least a portion of the first region is within the current field of view.

In some such embodiments, the method includes selecting a color based on the service benefit, wherein the indication of the service benefit is provided by displaying the first graphical overlay with the selected color. In some embodiments, where the retrieved record further identifies a signal strength associated with the first network access point, the method further includes selecting a level of opacity based on the signal strength, wherein the first graphical overlay is displayed with the selected opacity. In some embodiments, the retrieved record further identifies a signal strength associated with the first network access point, the method further comprising selecting a color based on the signal strength, wherein the first graphical overlay is displayed with the selected color. In some embodiments, the retrieved record further identifies a bandwidth associated with the first network access point, the method further comprising selecting a level of opacity based on the bandwidth, wherein the first graphical overlay is displayed with the selected opacity. In some embodiments, the retrieved record further identifies a signal strength associated with the first network access point, the method further comprising selecting a level of color saturation based on the signal strength, wherein the first graphical overlay is displayed with the selected color saturation. In some embodiments, the retrieved record further identifies a bandwidth associated with the first network access point, the method further comprising selecting a level of color saturation based on the bandwidth, wherein the first graphical overlay is displayed with the selected color saturation.

In some embodiments, the graphical overlay includes a callout bubble identifying the service benefit. In some embodiments, the first graphical overlay is a spatial volume. In some embodiments, the first graphical overlay is a point cloud.

In exemplary embodiments, the service benefit identified in the record may be, for example, discounted or priority access to content provided by the first content provider.

In a further exemplary embodiment, the determined location of the device is used to retrieve a record of at least a second proximate network access point, wherein the retrieved record identifies (i) at least one second service benefit provided by a second content provider at the second network access point and (ii) a second region in which a signal from the second access point is expected to be available. The augmented reality display device then displays at least a second graphical overlay registered to the second region, where the second graphical overlay including an indication of the second service benefit.

Further described herein are exemplary augmented reality devices, including an augmented reality device comprising: an augmented reality display; a location determination module operative to determine a location of the augmented reality display device; a network communication interface; a processor; and a non-transitory computer readable medium storing instructions operative, when executed on the processor, to perform operations comprising: using the determined location to retrieve a record of at least a first proximate network access point, wherein the retrieved record identifies (i) at least one service benefit provided by a first content provider at the first network access point and (ii) a first region in which a signal from the first access point is expected to be available; and displaying on the augmented reality display at least a first graphical overlay registered to the first region, the first graphical overlay including an indication of the service benefit.

In some exemplary methods a graphic overlay is provided on an augmented reality display, where the graphic overlay indicates a location of a wireless network including a graphic indication of a service benefit available on the wireless network. The service benefit may be a benefit provided by a content provider, such as enhanced access, discounted access (including free access), or priority access to content provided by a content provider. The graphic indication of the service benefit may include a selected color associated with a content provider providing the benefit. The graphic indication of the service benefit may include a callout bubble identifying the benefit. The callout bubble may identify a content provider providing the benefit.

The graphic overlay may take various form. In various embodiments, the graphic overlay may be a point cloud, a cube or other polyhedron, or a region having a level of opacity or a level of color saturation, among other alternatives. In embodiments using a level of opacity, the level may be used to indicate one or more of a variety of factors. For example, the level of opacity or level of color saturation may be determined based on signal strength, on cost of access, on bandwidth, or on other factors.

In some embodiments, an augmented reality apparatus is provided that is operative to provide, on an augmented reality display, a graphic overlay indicating a location of a wireless network including a graphic indication of a service benefit available on the wireless network.

In some embodiments, an augmented reality network discovery method is provided. In some such methods, at least the following steps are performed: determining a location of a user; identifying a location proximate to the user at which access to at least one wireless network is available; identifying a network service provider associated with the wireless network; identifying at least one content provider providing a service benefit through the network service provider; and rendering a visual indication of the service benefit as an augmented reality overlay on the identified location. The identification of the location at which access to the wireless network is available includes checking a database for wireless access points near the location of the user. The determining of the location of a user may be performed using the global positioning system.

In some embodiments, a method is provided for visualizing an available network service and a quality of service thereof. In some such methods, at least the following steps are performed: determining a plurality of wireless network access points each having expected signal availability in a spatial volume within a determined present field of view of an augmented reality display device; determining wireless connectivity providers associated with each wireless network access point of the plurality of wireless network access points each having expected signal availability in a spatial volume within a determined present field of view; presenting, using the augmented reality display device, a plurality of visual indications of information services available via at least some of the wireless connectivity providers associated with each wireless network access point of the plurality of wireless network access points each having expected signal availability in a spatial volume within a determined present field of view of the augmented reality display device.

In some such embodiments, each visual indication is presented to appear to the user at a location where expected signal availability for the associated wireless connectivity provider is available. A determination may be made that a signal is expected to be available when signal strength is above a threshold.

In some embodiments, a method is provided for visualizing available network service and its quality of service. In some such methods, at least the following steps are performed: collecting data from service benefit agreements and partnerships between content providers and network service providers (NSPs); collecting data on network-level attributes in the physical environment of a location of interest; computing the overall service quality for a location of interest; and displaying an indication of the overall service quality as an augmented reality overlay on the region of interest.

In some embodiments, a method is provided comprising: capturing a perspective viewpoint, which may be the viewpoint of an augmented reality headset; receiving network information; and displaying a graphic overlay on the perspective viewpoint representing the network information. The graphic overlay may be displayed over the perspective viewpoint using an augmented reality head-mounted display of the augmented reality headset.

The perspective viewpoint may be captured using a camera, such as a forward-facing camera on an augmented reality display device. A network region in the viewpoint may be identified using a visual fiducial, a near-field communication (NFC) beacon, smart floor tiles, GPS positioning, a range finder, WiFi positioning, and/or other techniques.

In some such embodiments, the graphic overlay comprises a set of graphic indicators. The graphic indicators may be dynamically adjusted in response to a user request. The graphic indicators may be preconfigured by a user. The set of graphic indicators may comprise region shapes (cubes, clouds, spheres, etc.). In various embodiments, the set of graphic indicators may comprise region boundary lines, colors, opacity levels, message bubbles, and/or symbols.

In some such embodiments, the network information comprises user reviews, such as a review of a physical location corresponding to a respective network region. In some embodiments, the network information comprises information regarding one or more service benefit agreements between content providers and network service providers. In some embodiments, the network information comprises network-level attribute information, which may be collected via crowdsourcing. The network-level attribute information may include information such as measured bandwidth, an NSP ID, and/or received signal strength (RSS) information. In some embodiments, an overall service quality is calculated for each of the at least one network regions based on the network information.

In some embodiments, an apparatus is provided, with the apparatus comprising: a perspective acquisition device configured to capture a perspective viewpoint; a processor configured to receive network information; and a rendering module configured to generate a network visualization, and to project the network visualization on the perspective viewpoint.

BRIEF DESCRIPTION OF THE DRAWINGS

In FIG. 6A, the device is directed more toward the left side of the scene, and in FIG. 6B, the device is directed more toward the right side of the scene.

In FIG. 9A, the scene is visible through an optical see-through display. In FIG. 9B, the scene itself is not shown, and only the augmentations themselves are illustrated.

DETAILED DESCRIPTION

Figure 1:
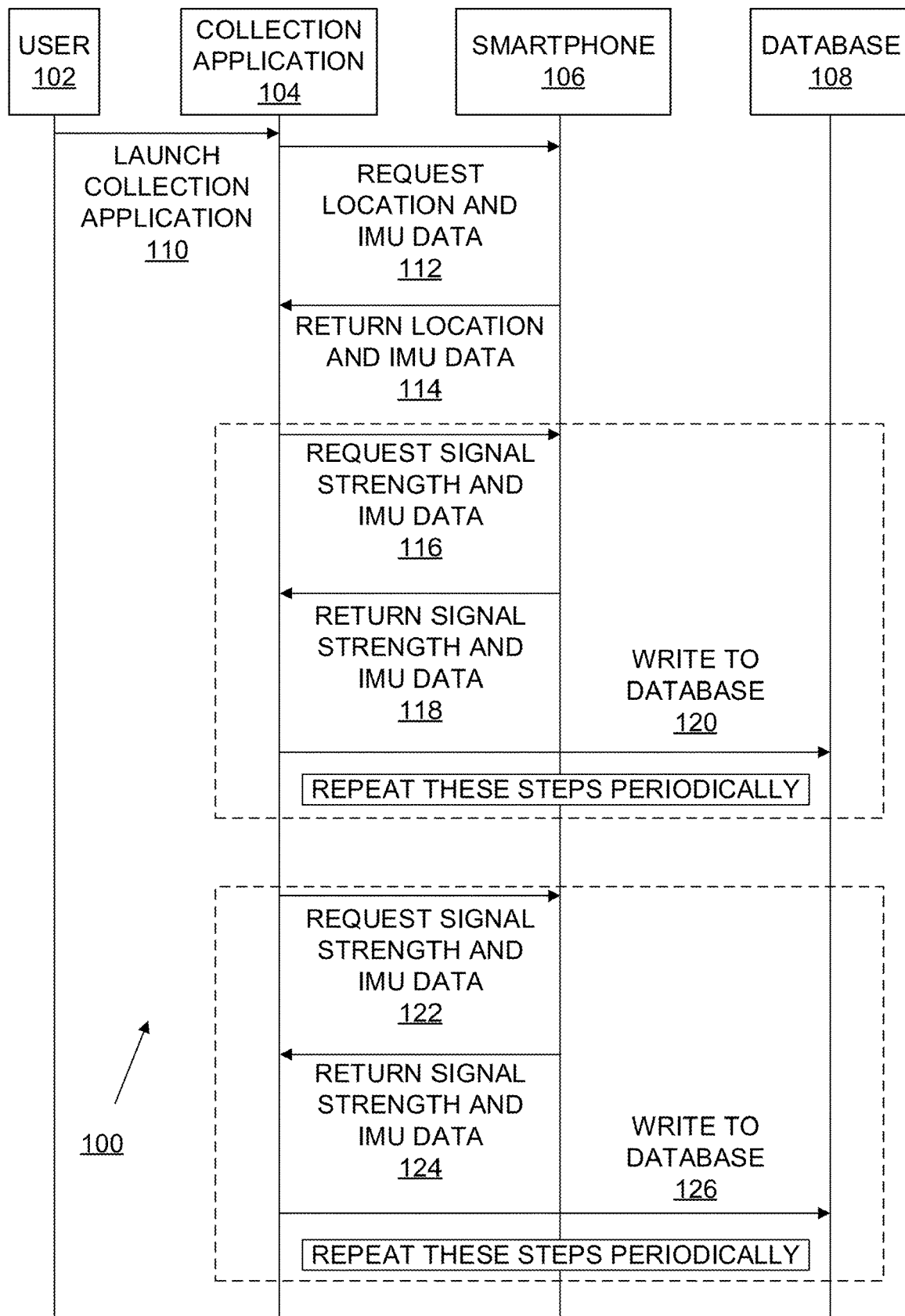
FIG. 1 is a sequence diagram illustrating a process, in accordance with some embodiments.

Increasingly, factors other than low-level networking aspects may determine the quality that a consumer may expect to receive from a network service. For example, through partnerships with content providers, network service providers (NSPs) may promote or prioritize certain content, allowing the prioritized content to transit their networks at a higher priority (and thus with greater performance) than other content. In other cases, NSPs may allow use of certain content providers without counting this use against data plans or other caps. As one example, T-Mobile has partnerships with a variety of content providers to allow streaming music applications—which would normally use large amounts of bandwidth—to not count against users' data plans. In other cases, users who are customers of a given service may have free or discounted access on networks that may otherwise require payment (e.g. users of certain tiers of AT&T wireless may receive free access to AT&T hotspots). Such partnerships greatly affect the received customer service of consumers who use these networks and provide an incentive for them to return to places where these service benefit agreements are in effect.

It may be difficult for consumers to ascertain which places provide a desired level of service for content that the users wish to access. This is a complex decision process that hinges on knowledge of these service benefit agreements and knowledge of the physical location of the networks.

Currently, information used to assess the potential received quality for a given service is buried. The information is hidden on the websites of various content providers, service providers, and network providers. While the services a user does business with may attempt to keep the user informed of the possibilities (e.g., regular emails from Netflix about their partnerships with a given NSP), these attempts may be difficult for the user to keep track of. Further, when in a mobile setting, users may have no idea where the NSPs have a presence. Thus, it is desirable to provide users with an understanding of how various factors affecting service quality come together such that one NSP may provide a better customer experience than another. It is further desirable to enable users wishing to use a given service to physically locate a given NSP's network in order to take advantage of the service. While there are maps showing locations of wireless networks in the physical world, these maps do not generally provide information about advantages of services that these networks may provide.

Embodiments described herein allow end-user consumers to discover locations with a desired level of service for a given content provider. This process is facilitated by an AR presentation that allows the user to scan his or her spatial environment, and see graphical indicators of the quality of service that a user may expect in certain regions overlaid atop the reality view. Embodiments described herein involve several steps, and each may be performed in a variety of ways.

In an exemplary embodiment, data is assimilated from service benefit agreements and partnerships and used with an augmented reality presentation. This data may be collected from a variety of sources. In some embodiments, data may be provided by NSPs or content providers themselves. In some embodiments, data may be collected and provided by third party entities (such as the various "hotspot finder" applications and services known in the art). In some embodiments, data may be crowd-sourced, with multiple independent users collecting and providing data on service quality in various locations. This data assimilation may be periodically updated as service benefit agreements change.

Data may further be collected from network-level assessments of service quality. This data may include information such as overall signal strength in a given area, or bandwidth limitations on a given network. These network-level assessments may be used in some embodiments to supplement the service-level assessments. For example, if a given NSP has a partnership with a streaming video provider, but at a particular site the bandwidth is too limited to use the associated streaming video services effectively, the overall service quality will still be poor. In some embodiments, such network-level assessment data is collected via crowdsourcing.

In some embodiments, a metric of overall service quality is computed along a number of dimensions, based on data collected regarding network-level assessments and service benefits provided through service benefit agreements between NSPs and content providers. Information regarding the service quality may then be displayed in an augmented reality presentation on a mobile device.

The collection of data about service benefit agreements between content providers and NSPs may be performed in various ways. Collected data may be stored as a table with network providers and content providers along the two axes, and each intersection providing details about the service benefit agreements between that pair of entities. Table 1 illustrates an example:

TABLE 1

|  | AT&T | T-Mobile | Boingo |
|---|---|---|---|
| Netflix | Prioritized service | — | — |
| Apple Music | — | Not charged against data plan | — |
| Spotify | — | — | Ad-free |
| Amazon | — | — | Free access from this network |

A dash ("-") in Table 1 indicates that no service benefit agreement exists for that pair. Cell contents indicate user-salient attributes of accessing a given service from a network service provider (NSP) along the top axis. While the cell contents here are provided in English, some embodiments may use a computer-readable taxonomy of symbols representing different service attributes. In some embodiments, collecting data about service benefit agreements between content providers and NSPs includes receiving data directly, e.g., from a NSP or a third party application. In some embodiments, data may be stored in a database of current service benefit agreements between content providers and NSPs. In some embodiments, a database may be represented as a table with two columns ("location" and "additional agreements") listing any special service benefit agreements that exist at that specific location. In some embodiments, collecting service benefit agreement data includes receiving data via crowdsourcing. In some embodiments, crowdsourcers may flag additional service benefit agreements about a given NSP in their collected data while using the given NSP, or while being in range of a given NSP. In some embodiments, content providers may have service benefit agreements with NSPs (e.g., AT&T or Google). In some embodiments, content providers may have a service benefit agreement with a given access-point provider (APP). For example, a store or coffee shop owner such as Starbucks may have such service benefit agreements.

In some embodiments, the collection of data regarding service benefit agreements may utilize databases associating SSIDs with NSPs and latitude/longitude locations in order to assist in determining a service benefit agreement with a given content provider. In some embodiments, the database may include network information (such as network-level attributes and service benefit agreement information) that is associated with a network region. In some embodiments, a service benefit agreement may be determined based on a given NSP and a given content provider (e.g., AT&T and Netflix). In some embodiments, an APP may have a service benefit agreement directly with a content provider for a single location, or in other cases a general service benefit agreement for all locations (e.g., Starbucks may have a Spotify agreement at the location in Table 2, or all Starbucks locations may have Spotify agreements). In some embodiments, a NSP database may associate general service benefit agreements between a given NSPs with content providers. In some embodiments, an APP database may associate general service benefit agreements between a given APP. In some embodiments, a content provider may associate location-specific service benefit agreements with NSPs and APPs.

A sequence diagram illustrating a process 100 for data collection is shown in FIG. 1. In response to a user 102 launching 110 the collection application, the application 104 requests location data (e.g., from GPS circuitry) and inertial measurement unit (IMU) data 112 from a mobile device (or smartphone) 106 on which the application 104 is running. The requested data is returned 114 to the application 104. Either periodically with some pre-determined frequency, or triggered by motion by the user 102, the application 104 polls the phone 106 for updated IMU data, network SSIDs visible from that location, and signal strength data 116. This data is returned 118 to the application 104 and written 120 to a database 108 of position/signal strength records (represented as tuples in the database). These steps 116, 118, 120/122, 124, 126 may be repeated, either periodically or as the user 102 moves the device 106. In some embodiments, the collection application 104 may provide feedback (not shown in FIG. 1) to the user 102 to direct the user 102 to move to collect data for a more complete map—for example, by determining "empty" regions in the collected data, a system may prompt the user 102 to move to these regions to collect more data.

As multiple users 102 execute this process 100, the database 108 builds up a map of the networks, and network quality, in a region. For some embodiments, this process 100 is performed by a separate, stand-alone application. For other embodiments, this process 100 is performed during the viewing of collected data. That is, in some embodiments, a collection process 100 occurs simultaneously with a viewing process, resulting in a self-correcting update of a network attributes database as users 102 use an application.

Exemplary embodiments include a process 100 of collecting data on network-level attributes in a physical environment at various locations (sometimes represented by latitudes (lat) and longitudes (long)). This process may include the existence of certain networks at a given location ("at <lat, long> there exists an AT&T hotspot") as well as potential performance assessments of the given network ("signal strength is weak for network SSID <att_hotspot> at <lat, long>" or "bandwidth max is 1.5 mbps for network SSID <att_hotspot>"). In some embodiments, this data may be collected in a crowd-sourced manner.

Table 2 illustrates an exemplary output of network-level data collection, with each row indicating a given reading collected through the process 100. Columns indicate observed SSID and various other attributes of the network quality:

TABLE 2

| Location | SSID | RSS | Measured Bandwidth | NSP/APP ID |
|---|---|---|---|---|
| Lat = 34.771899 Long = −86.732941 | att_ hotspot | −54 dBm | 0.71 Mbps | AT&T |
| Lat = 35.12258 Long = −91.83992 | starbucks | −62 dBm | 8.5 Mbps | Starbucks |

Table 2 may be seeded with existing databases (such as from Place Lab), which maintain geospatial locations of SSIDs. See LaMarca, Anthony, et al., *Place Lab: Device*

*Positioning Using Radio Beacons in the Wild*, PERVASIVE COMPUTING, 116-133 (Springer Berlin Heidelberg, 2005), available at http://www.kevinli.net/courses/mobilehci_w2013/papers/placelab.pdf (Similar databases of hotspots exist at http://hotspot-locations.com, https://wigle.net, and elsewhere).

In some embodiments, network metric data may be collected for given SSIDs via crowd-sourcing. In such embodiments, various readings of network metrics such as RSS and bandwidth may be made by a user connected to a given SSID/location combination (automatically or manually) and uploaded to a crowd-sourced database containing various crowd-sourced metric readings for the SSID/location combination. The various crowd-sourced metric readings may be used to create network-quality point clouds. For some embodiments, an intensity graphic (such as via a point cloud, a level of opacity, or a level of color saturation) may be used to display a network-level attribute for a network region. Such network-level attributes may include signal strength and bandwidth. For some embodiments, such an intensity graphic may be dynamically adjusted in response to a user request. In some embodiments, there may be an aggregation step to optimize a crowd-sourced database, for example, by eliminating duplicate measurements or nearby measurements, or representing coarser-grained changes in quality. In some embodiments, some measurements may be discarded if they do not meet certain network quality requirements, as described below. In embodiments where at least two networks have the same SSID name, a location may be associated with each network in order to distinguish the networks. There are a variety of established techniques for creating so-called "spatial indexes" for a database that contains geo-spatial information. For searches, a spatial index may be used instead of the SSID or specific latitude/longitude coordinates. For example, a technique called R-Tree is one of the most widely-used spatial indexing algorithms, and the technique allows efficient performance of queries (such as, "select all network measurements within 100 meters of user's current location") when a database contains collections of specific coordinates. See Guttman, A., *R-Trees: A Dynamic Index Structure for Spatial Searching*, Proceedings of the 1984 ACM SIGMOD International Conference on the Management of Data (1984).

A computation may be performed to determine a metric of the overall service quality along a number of dimensions, based on the data collected regarding service benefit agreements and network-level quality. In some embodiments, a "natural join" operation is performed to combine data from the service agreements table (Table 1) with data from the network assessment table (Table 2), resulting in a collation of data about individual networks, the services available on them, and their performance at specific locations in the physical world.

For example, for service table S (Table 1) and network table N (Table 2), the result S ⋈ N (where ⋈ is the natural join operator) results in the following Table 3:

For fast access, this data may be organized geospatially, allowing use of specific locations expressed as <latitude, longitude> as keys into the data. In this way, given a specific location, the database may contain details about nearby networks, service benefits available through such networks, and overall quality. In some embodiments, as described above, a given SSID may have numerous readings from various points within the network region. In such embodiments, the readings may be collected via crowd-sourcing, as described above. A network region is a geographic area served by a network. In some embodiments, based on service benefit agreements associated with certain SSIDs, heuristics may be used in determining overall network quality. For example, if an SSID has a service benefit agreement with a streaming video content provider, and if high quality streaming requires a bandwidth of 3.0 Mbps, a mobile device application may create a point cloud from the collected network metric readings of the SSID in which all points of the point cloud have a bandwidth of at least 3.0 Mbps, and all other points are discarded. Such embodiments may reduce clutter in the AR representation by effectively reducing the displayed region of the SSID from all areas in which the SSID is visible to only the areas of the SSID where the network is strong enough for the content associated with the network. In such embodiments, rather than a direct mapping of network quality measurements to graphical attributes, a more indirect presentation may be offered in which areas are shown as offering no access at all to the streaming video service (even though the SSID may be visible) unless the quality parameters for this category of service are met. In some embodiments, the visualization parameters of the mobile application are automatically configured based on the network quality requirements of a known content (e.g., content from a video streaming service provider or an audio streaming service provider). In other embodiments, a user 102 may configure the mobile application based on a custom set of network quality requirements.

In some embodiments, parameters such as signal strength and/or bit rate of a wireless network are measured at particular points (e.g. through crowd-sourcing), and the value of the parameters between those points may be determined using an interpolation and/or a curve fitting algorithm, such as Barnes interpolation, bilinear interpolation, bicubic interpolation, spline interpolation, or other techniques.

In exemplary embodiments, collected and processed data is displayed as an augmented reality overlay. A user's augmented reality device presents a visualization of this data based on a user's location in his or her environment. In some embodiments, the user's current location is collected from a mobile device application, and provided to the database as a key. In other embodiments, a spatial index as described above may be used as the key. Nearby network records are returned (e.g., rows from the database table above of networks which are physically proximate to the user are

TABLE 3

| Location | SSID | RSS | Measured Bandwidth | NSP/APP | Netflix | Apple Music | Spotify | Amazon | ... |
|---|---|---|---|---|---|---|---|---|---|
| Lat = 34.771899 Long = −86.732941 | att_hotspot | −54 dBm | 0.71 Mbps | AT&T | Prioritized Access | | Ad-free | | |
| Lat = 35.12258 Long = −91.83992 | starbucks | −62 dBm | 8.5 Mbps | Starbucks | | | Prioritized Access | | |
| ... | | | | | | | | | | returned to the application). In some embodiments, a user may request a display of networks within a desired range of the user's current location.

In some embodiments, in order to represent differences in network quality over a small spatial region, individual measurements may be captured and—at least initially—stored in the database 108. This process allows a system to have information about changes in quality in small regions that may be presented to the user via the AR display. As described above, such databases may be formed via crowd-sourcing. In alternative embodiments, each row of Table 3 may represent the network itself. Such information may be collected without crowdsourcing, but rather by using public databases of network locations (e.g., Wigle.net), which have estimated locations of all networks. In such embodiments, however, a user may be presented with the location of a given network in the AR display, along with its service benefit agreements, but without the more fine-grained information about quality fall-off in the spatial region around the network's estimated location.

In some embodiments, the records of either crowd-sourced databases or public databases of network locations are used to generate a graphical overlay on top of a camera view from a user's mobile device, such as a user's smart-phone. In some embodiments, the visualization is sent to an external device, such as an AR head-mounted display (HMD) device, and the visualization provides a graphic overlay over the real world. This graphical overlay may be regenerated as the user's orientation changes (e.g., head tracking) so that from the perspective of the user, the graphical overlay remains registered spatially with the "reality" view from the user's camera or other device.

The data collected regarding network-level service quality may be made quite robust by integrating the network assessment into the usage of an application for display to a user. Because a system may determine the user's location during a display process, a system may perform a simultaneous network-level assessment that updates the data for that location. This, in effect, produces a self-correcting system for the network-level data, as usage of a system refines and improves its overall quality of data. As described above, when using crowd-sourced databases, some points may be discarded that do not meet network-quality parameters in order to reduce visual clutter in the AR visualization. In such embodiments, the network-quality parameters may be automatically assigned based on the content (e.g. streaming video, streaming audio, or other content) or manually set by the user.

Figure 2:
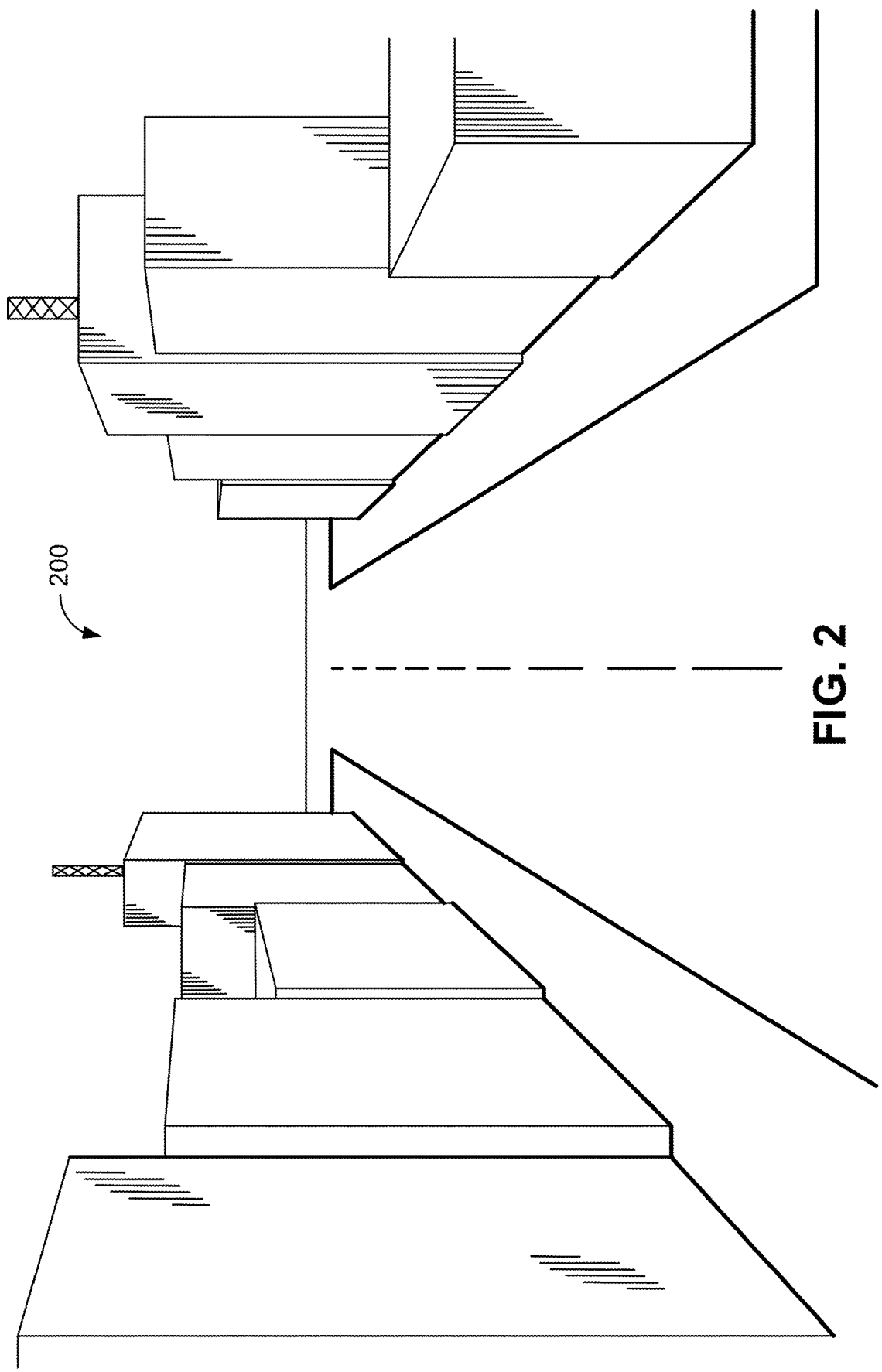
FIG. 2 is a perspective view of an outdoor scene used in the illustration of augmented reality overlays depicted in FIGS. 3-5, 6A, 6B, 9A, and 9B.

FIG. 2 is a perspective view of an outdoor scene 200, such as a scene that may be captured by a forward-facing camera on an augmented reality device. Scene 200 is illustrated without any augmented reality overlays to provide a better understanding of FIGS. 3-5, 6A, 6B, 9A, and 9B, in which augmented reality overlays are depicted with respect to the same scene.

Figure 3:
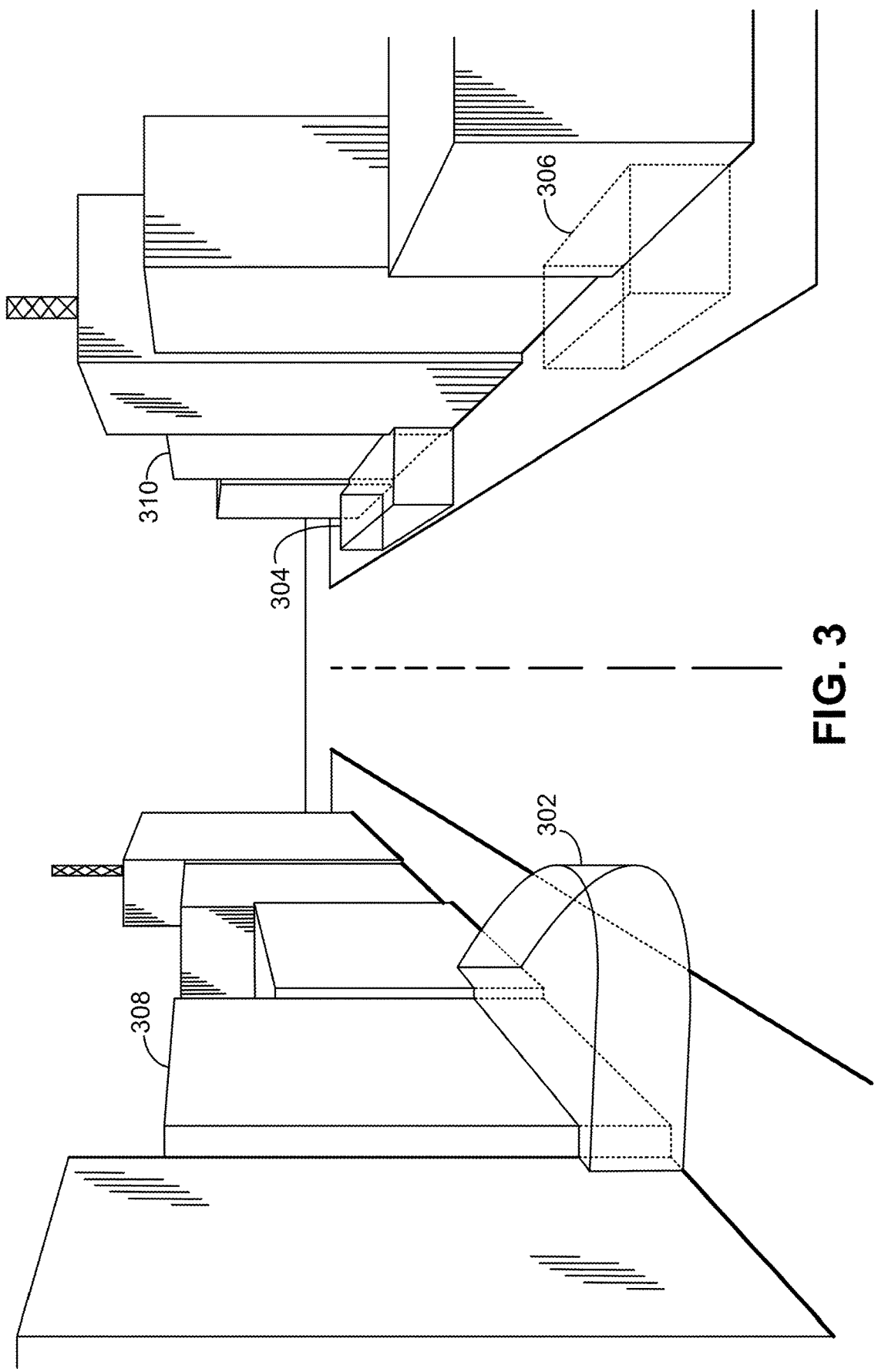
FIG. 3 is a perspective view of the outdoor scene of FIG. 2 together with augmented reality overlays according to an embodiment.

FIG. 3 is a perspective view of the outdoor scene of FIG. 2 as viewed with exemplary augmented reality overlays provided through an augmented reality display device. In the example of FIG. 3, three augmented reality overlays 302, 304, and 306 are displayed with locations registered to real-world regions within a signal is expected to be available for respective wireless network access points. FIG. 3 illustrates example visualization of network data as seen using an augmented reality device in accordance with some embodiments. In an exemplary embodiment, the environment 200 (FIG. 2) is captured by a camera and presented on a smartphone display from the position of the user. In some embodiments, the view of FIG. 3 is generated by an AR head-mounted display. In other embodiments, various other devices may be used. In the example of FIG. 3, augmented reality overlays 302, 304, 306 provide indications of service quality and of the availability of one or more service benefits. The regions are rendered using a 3D perspective and are rendered as translucent overlays in a layer above the view of the scene 200 and are registered with the scene 200. The overlays may have various shapes and forms in different embodiments. Overlays 304 and 306 have a generally box-shaped form, while overlay 302 has the form of a generally cylindrical section. In other embodiments, overlays may be rendered as cubes, point clouds or as other forms. In an exemplary embodiment, the regions indicated by the overlays 302, 304, 306 are regions within which a signal is expected to be available (e.g. based on crowd-sourced measurement) for a respective wireless access point.

Different visual properties of the augmented reality overlays may convey to a user various information regarding the respective network access point. In some embodiments, different overlay colors are used to represent information about the access points. In one example, different colors are used to represent different content providers from whom a service benefit is available at the respective network access point. A default color may be used for access points that are not associated with any service benefit. In another example, different colors are used to represent different expected signal strengths (e.g. as collected through crowd-sourcing). In a further example, different colors are used to represent different expected bandwidths (e.g. as measured through crowd-sourcing).

In some embodiments, different levels of overlay opacity are used to represent information about the access points. In one example, different levels of opacity are used to represent different expected signal strengths. In a further example, different levels of opacity are used to represent different expected bandwidths.

In some embodiments, different levels of color saturation are used to represent information about the access points. In one example, different levels of color saturation are used to represent different expected signal strengths. In a further example, different levels of color saturation are used to represent different expected bandwidths.

In the example of FIG. 3, the overlay 306 is illustrated using dotted lines, illustrating (within the constraints of the line drawing format) a low level of opacity and/or low level of color saturation. This low level of opacity and/or color saturation may indicate, for example, a low expected signal strength and/or a low expected bandwidth of the associated access point.

As an example, an overlay associated with a network access point that provides a higher level of access to streaming video content from a particular content provider may be colored in purple. An overlay associated with a network access point that provides a higher level of access to streaming audio content from a particular content provider may be colored in green. With reference to FIG. 3, for example, if overlay 302 is displayed in purple and overly 304 is displayed in green, a user interested in viewing streaming video may select a café in building 308 over a restaurant in building 310.

Figure 4:
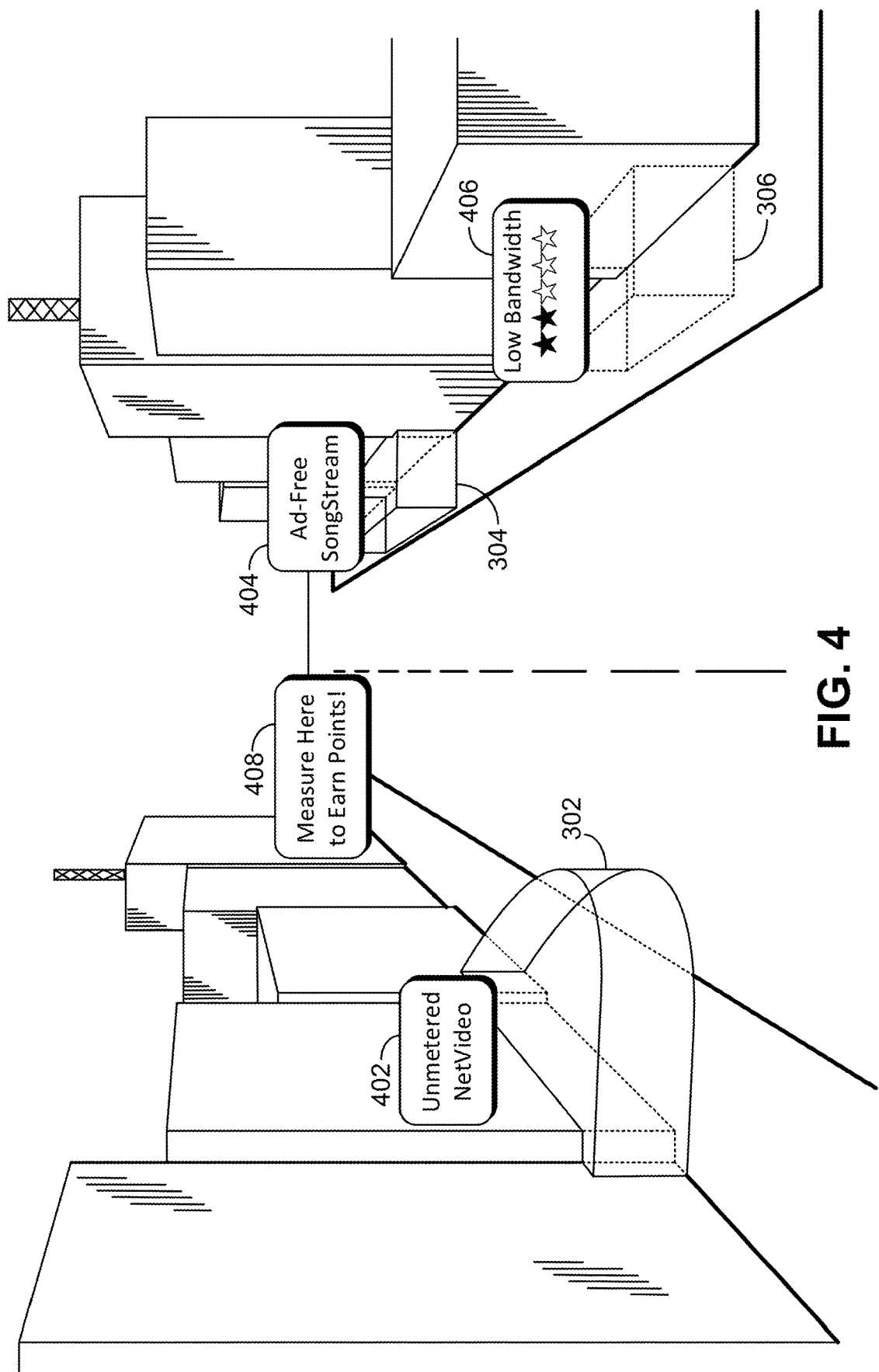
FIG. 4 is a perspective view of the outdoor scene of FIG. 2 together with augmented reality overlays according to an embodiment.

In some embodiments, the user may tap on or otherwise select the region to pull up additional information regarding the quality and/or service benefits of one or more network access points. In some embodiments, such additional information may be displayed by default. FIG. 4 illustrates an augmented reality view in an embodiment in which additional indications are provided that identify service benefits and/or provide other information. These additional indications may be provided in the form of callout bubbles or in other forms. In the example of FIG. 4, callout bubble 402 displays text indicating that, at the access point associated with overlay 302, access to streaming video from a particular content provider (the fictional "NetVideo") is unmetered. Callout bubble 404 displays text indicating that, at the access point associated with overlay 304, access to streaming audio from a particular content provider (the fictional "SongStream") is provided without advertisements. Callout bubble 406 displays text indicating that the access point associated with overlay 306 has a low bandwidth. Callout bubbles may also provide additional data. For example, the callout bubble 406 displays a star rating for the access point. The star rating may be generated as an aggregation of star ratings from several users. In various embodiments, the star rating may refer to the quality of network access or the desirability of the physical location at which the access point is located. The callout bubbles may be displayed as overlays registered to the locations of the respective access point.

Further illustrated in FIG. 4 is an additional callout bubble 408 identifying a region for which little or no data is available regarding network parameters. A user may be offered incentives (e.g. discounts and/or other rewards) for moving to such a region to collect data that can be stored in the database to be shared with other users.

In some embodiments, network parameters such as signal strength and/or bit rate are measured and mapped on a substantially two-dimensional plane. This may be done where, for example, network parameter measurements are carried out on a crowd-sourced basis by, for example, smartphones, which are typically in use between around 0.5 m and 2 m above the ground. Given a set of measurements of a network parameter at particular positions (e.g., particular x and y coordinates, where x and y may be latitude and longitude or other coordinates), estimated parameter values between points of measurement may be determined using interpolation, surface fitting, or other techniques. A two-dimensional region may be selected in which the estimated or measured parameter is above a threshold (e.g., where the network parameter is bit rate, the threshold may be 1 Mbps, 3 Mbps, or some other value). The two-dimensional above-threshold region may be converted to a three-dimensional display region by, for example, extruding the two-dimensional above-threshold region to a predetermined elevation (such as 3 m, or some other value). The three-dimensional display region is displayed to the user on an augmented reality device. A displayed color of the display region may be selected to correspond to a content provider that provides a service benefit (e.g. priority or free connectivity) on the associated network. For example, the display region may be colored purple to indicate that the network service provider has a service benefit agreement with a particular streaming video provider, or green to indicate that the network service provider has a service benefit agreement with a particular streaming audio provider. A displayed opacity of the display region may be selected to indicate another parameter, such as a cost of connectivity, signal strength, or bit rate.

In some embodiments, size and position of the displayed regions may be based on collected measurements (e.g., the crowd-sourced database). In such embodiments, the boundary of the region may represent the start of the region in which network quality passes some threshold which may be dependent on network quality metrics associated with the type of the service, as described above. In some embodiments, for very common networks, the region may represent the spatial areas in which network quality exceeds some threshold. This threshold may be set by the user or set autonomously by a system as a parameter. In some embodiments in areas with poor network density, it may be desirable to display even networks with relatively poor signal quality on the theory that such networks are preferable to no network at all.

Different network attributes may be mapped using various different graphical attributes. In embodiments described above, different service benefits are mapped to different overlay colors and performance is mapped to opacity, but any of the network attributes above may be mapped onto graphical attributes including color, opacity, texture, size, shape, ornamentation (graphical icons such as the star), and more. In some embodiments, a user may configure custom mapping settings via a user interface (UI) presented by an application. In some embodiments, additional options may allow the user to filter based on content provider (for example, only access points with a service benefit related to streaming video) or other attributes.

In exemplary embodiments, the graphical overlays retain the 3D perspective of the real environment. For example, overlays for signal areas that are farther away are rendered in a smaller size. In some embodiments, as the user moves or reorients the mobile device, the display shifts, revealing hidden detail or allowing "zooming" on a region by getting closer to it.

In some embodiments, collection of network-level quality data is not performed. A mobile device may use publicly available geo-coded databases of hotspots, along with collected service-level data, to create a visualization of sites with certain service benefits. However, the combination of service-level data with the network-level data may create a more compelling solution, as multiple aspects of the received customer service quality may be visualized.

In some embodiments, other data is collected as a part of the process, such as user ratings, reviews of the physical sites where the networks are located (e.g., whether this café is pleasant enough to watch a two-hour streaming movie), and so forth.

In exemplary embodiments, GPS and Wi-Fi positioning are used to detect location. In some embodiments, other mechanisms are used, such as NFC beacons (such as iBeacons), visual fiducial markers detected via camera, or other indoor positioning systems such as smart floor tiles.

In the scope of AR, a variety of end-user visualizations may be used, such as using different colors to denote signal quality, or including interactive icons in the presentation (to allow, for instance, the user to explore a region based on service availability).

Described embodiments allow easy visualization of a complex, multi-dimensional space of variables that may affect service quality and the selection of which network to use. Unlike approaches that merely visualize signal strength, exemplary embodiments disclosed herein collect and present in an intuitive way information on multiple factors that may impact service selection.

Exemplary visualizations disclosed herein occur in context, (e.g., overlaid atop a live view of the spatial region the user is in), but do not require extensive physical site maps or blueprints. In some cases, networks may be detected that are not in the user's line of sight (e.g., behind a building or some other obstruction). In such embodiments, it may still be desirable to render these networks, as the user may wish to know that the network is there and walk to it. For some embodiments, to reduce visual clutter, networks may be displayed if they meet user-set parameters of minimum signal strength and/or maximum distance away.

The augmented reality presentation allows a user to activate an application, and "look around" a region, seeing areas of high and low service quality rendered over the top of the live view of the area. This presentation is "live" in the sense that, as the user moves through the environment or reorients the mobile device, he or she views additional signal data from the new perspective. This process allows experimentation and exploration of various networks and services available.

Figure 5:
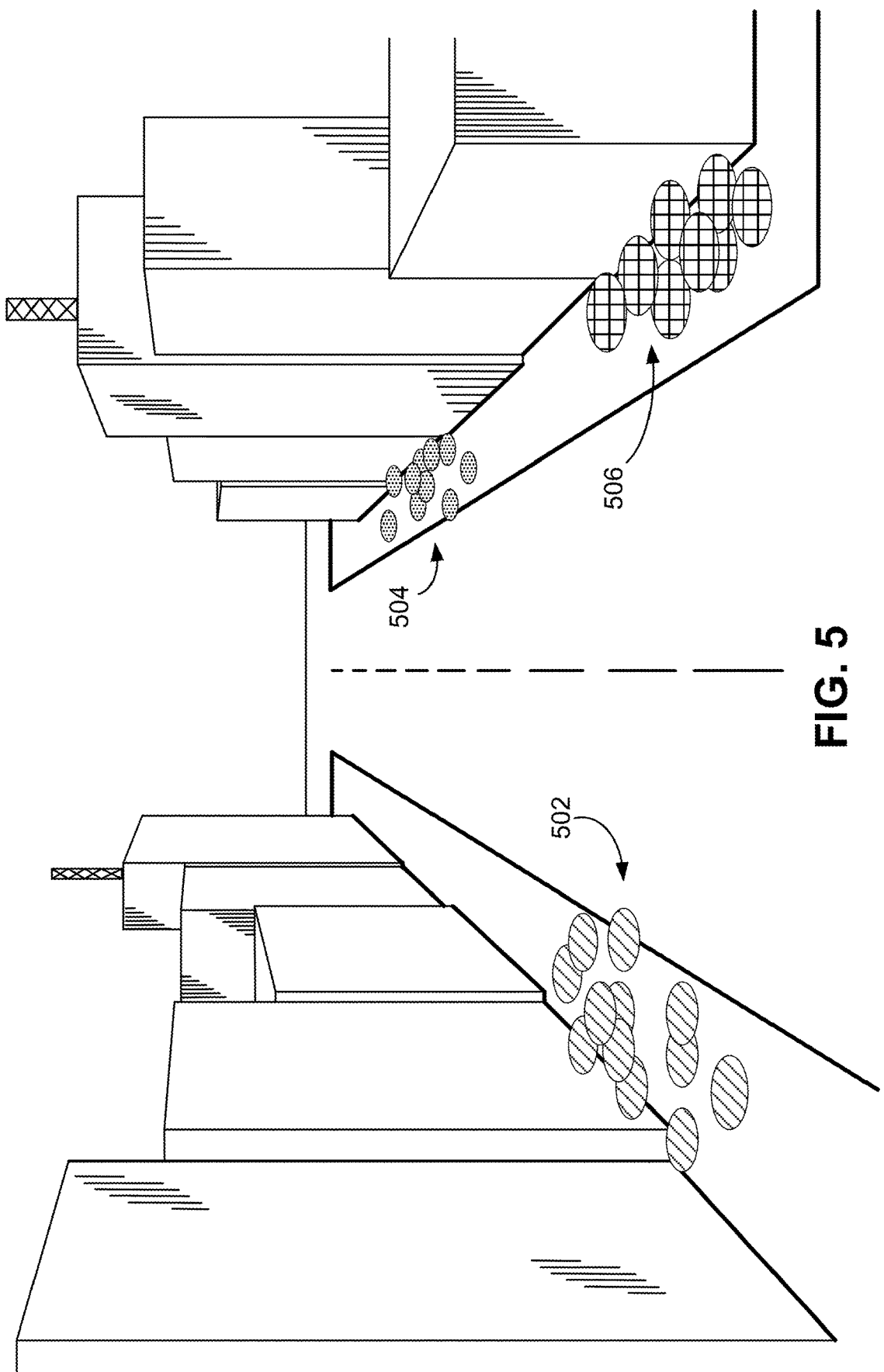
FIG. 5 is a perspective view of the outdoor scene of FIG. 2 together with augmented reality overlays according to an embodiment.

FIG. 5 illustrates an exemplary augmented reality view of the scene of FIG. 2. In the embodiment of FIG. 5, regions in which a signal from an access point is expected to be available are depicted as point clouds. Specifically, point clouds 502, 504, and 506 are illustrated and correspond to respective access points. In some embodiments, each point in a point cloud represents an actual position at which a network-level quality measurement (e.g. signal strength) was made. In some embodiments, points in the point cloud do not necessarily represent positions at which actual measurements were made; instead, points may be generated such that a density of points at a particular area corresponds to a network-level measurement, such as signal strength, at that area. For example, the probability of a point being displayed at a particular position may be proportional to signal strength at that position. Point colors may be selected so as to correspond to a particular service benefit available at that access point.

Figure 6A:
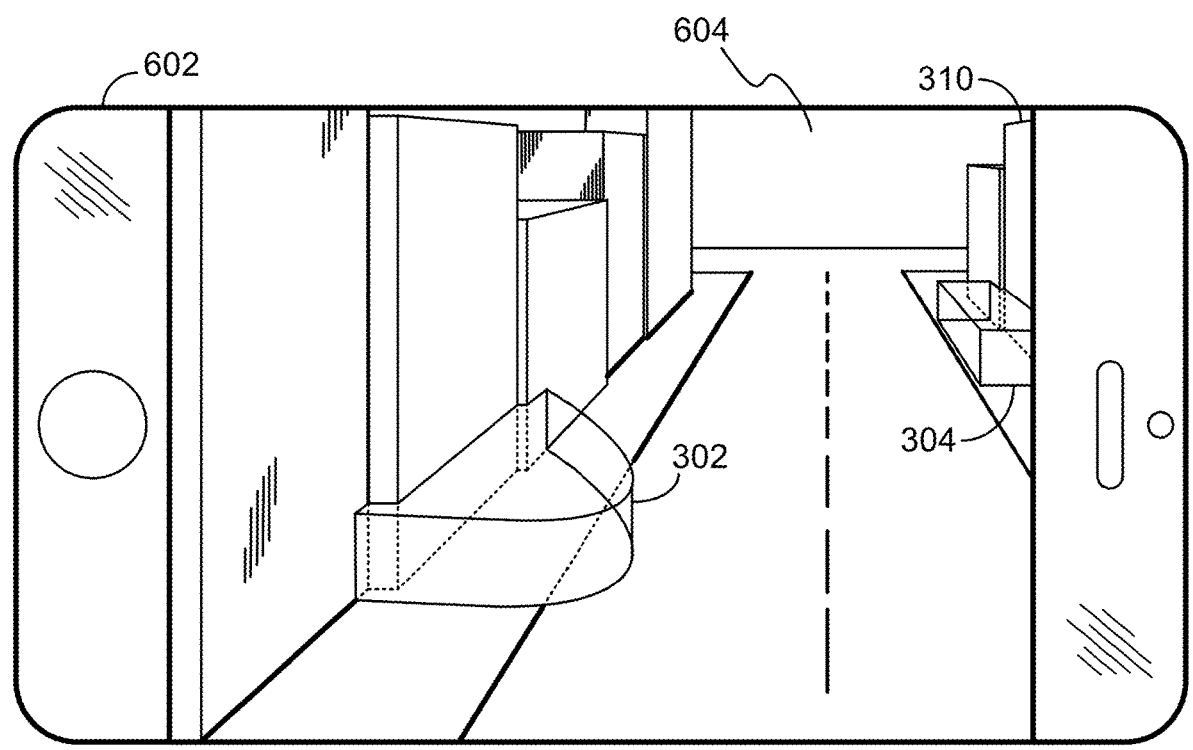
FIGS. 6A and 6B are front views of an augmented reality display device on which an augmented display of the scene of FIG. 2 is displayed, according to an embodiment.
Figure 6B:
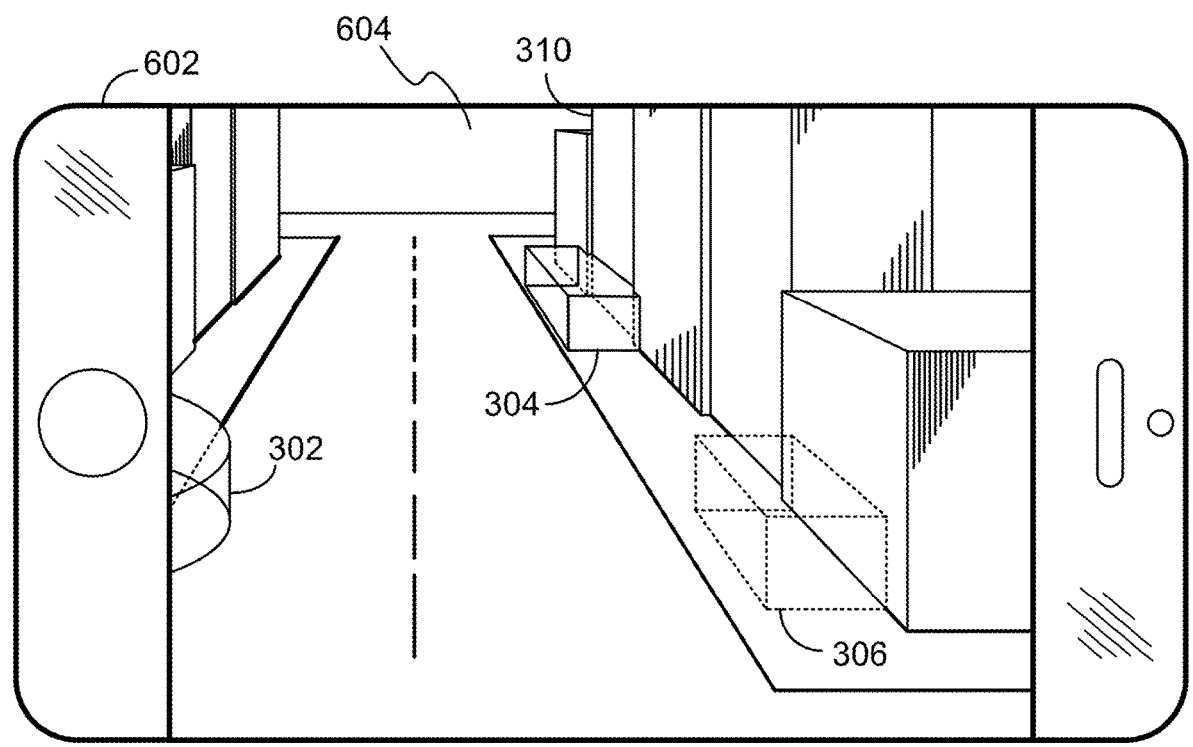

FIGS. 6A-6B illustrate two views of an augmented reality device 602 displaying a portion of the scene of FIG. 2 along with graphical overlays registered to the respective regions in which a respective access point signal is expected to be available. In the examples of FIGS. 6A-6B, the augmented reality display device 602 is a smartphone having a forward-facing camera (element 704 of FIG. 7) for capturing the scene and a display (e.g. LCD or LED display screen) 604 for displaying the scene along with augmentations indicating regions in which a signal is expected to be available. In FIG. 6A, the augmented reality device 602 is pointed relatively leftward toward the region corresponding to overlay 302, such that building 310 and overlay 304 appear toward the right edge of the display 604. In FIG. 6B, the augmented reality display device is turned relatively more to the right, such that overlay 304 and building 310 are displayed in a more central position on display 604. As may be noted in comparing FIGS. 6A and 6B, the graphical overlays 302 and 304 remain registered to respective corresponding positions in the scene. For example, overlay 304 remains registered to building 310, even though the position of building 310 on the screen 604 may change.

Figure 7:
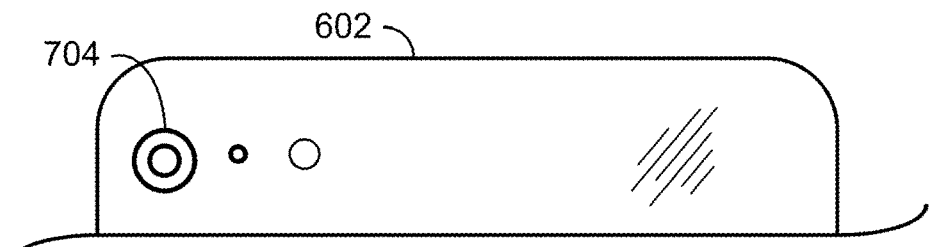
FIG. 7 is a partial rear view of the augmented reality display device of FIGS. 6A and 6B.

FIG. 7 illustrates a portion of the side of augmented reality display device 602 opposite to the side illustrated in FIGS. 6A-6B. As seen in the view of FIG. 7, a forward-facing camera 704 is provided to capture the scene that is displayed on the screen 604.

Figure 8:
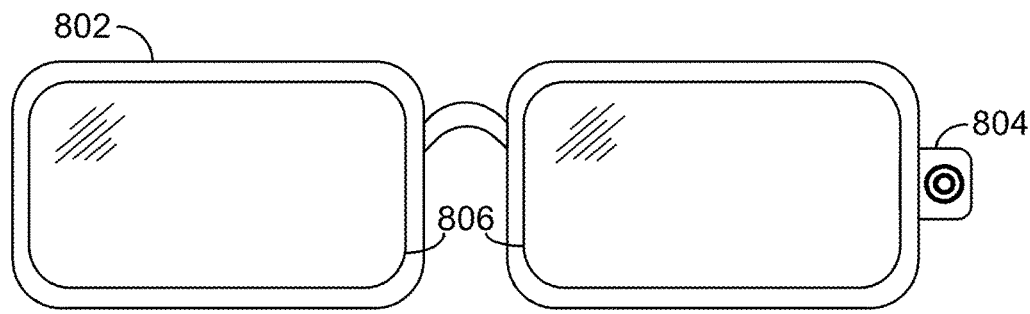
FIG. 8 is a view of a head-mounted display.

FIGS. 6A, 6B, and 7 illustrate the use of a smartphone as an augmented reality display device. It should be understood that other types of augmented reality display device may alternatively be used, such as head-mounted display devices. An exemplary embodiment using a head-mounted display device is illustrated with reference to FIGS. 8, 9A, and 9B. FIG. 8 is a schematic illustration of an augmented reality headset 802 as seen from the front (e.g. as seen by a person not wearing the headset). Augmented reality headset 802 includes a forward-facing camera 804 and optical see-through display 806.

Figure 9A:
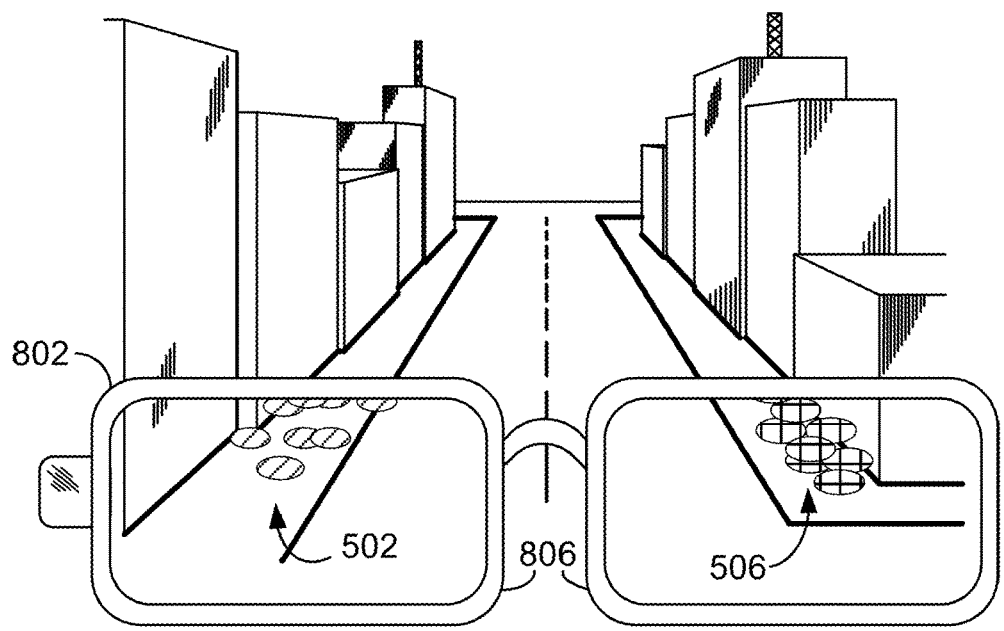
FIGS. 9A and 9B are schematic views of head-mounted display device used to display augmentations relative to the scene of FIG. 2.
Figure 9B:
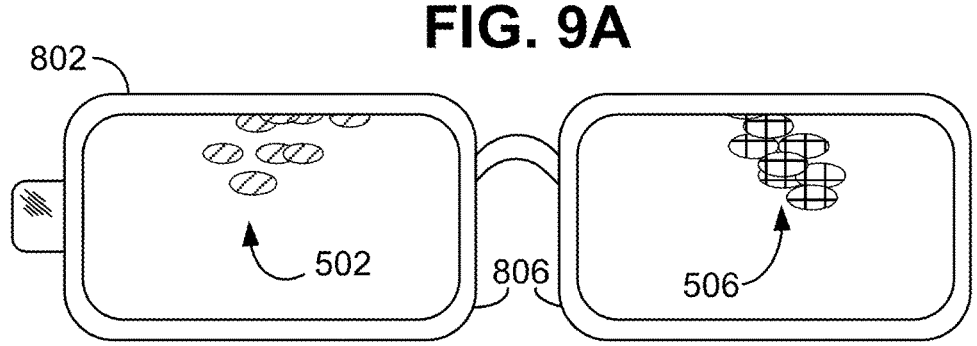

FIG. 9A schematically illustrates a view of the scene of FIG. 2 through the augmented reality headset 802. The real-world scene is viewed directly by the user through the optical see-through display 806. The display 806 also displays graphical overlays, such as point clouds 506 and 506, as overlays registered to respective regions in the real-world scene. In an exemplary embodiment, the forward-facing camera 804 is used in tracking the orientation of the headset 802 so as to keep the graphical overlays registered to their respective regions even when the headset is turned. It should be noted that FIG. 9A is merely schematic, and that it is not necessarily the case that, for example, overlay 502 would be displayed only to the left eye and that overlay 506 would be displayed only to the right eye. It may be the case that, for example, all augmentations are displayed only to one eye. FIG. 9B schematically illustrates the augmented reality headset 802, along with the graphical overlays 502 and 506, without the background scene. As is apparent in FIG. 9B, in some embodiments, an augmented reality display may display graphical overlays without actively displaying the background scene; instead, the background scene is viewed passively through see-through optics.

Figure 10:
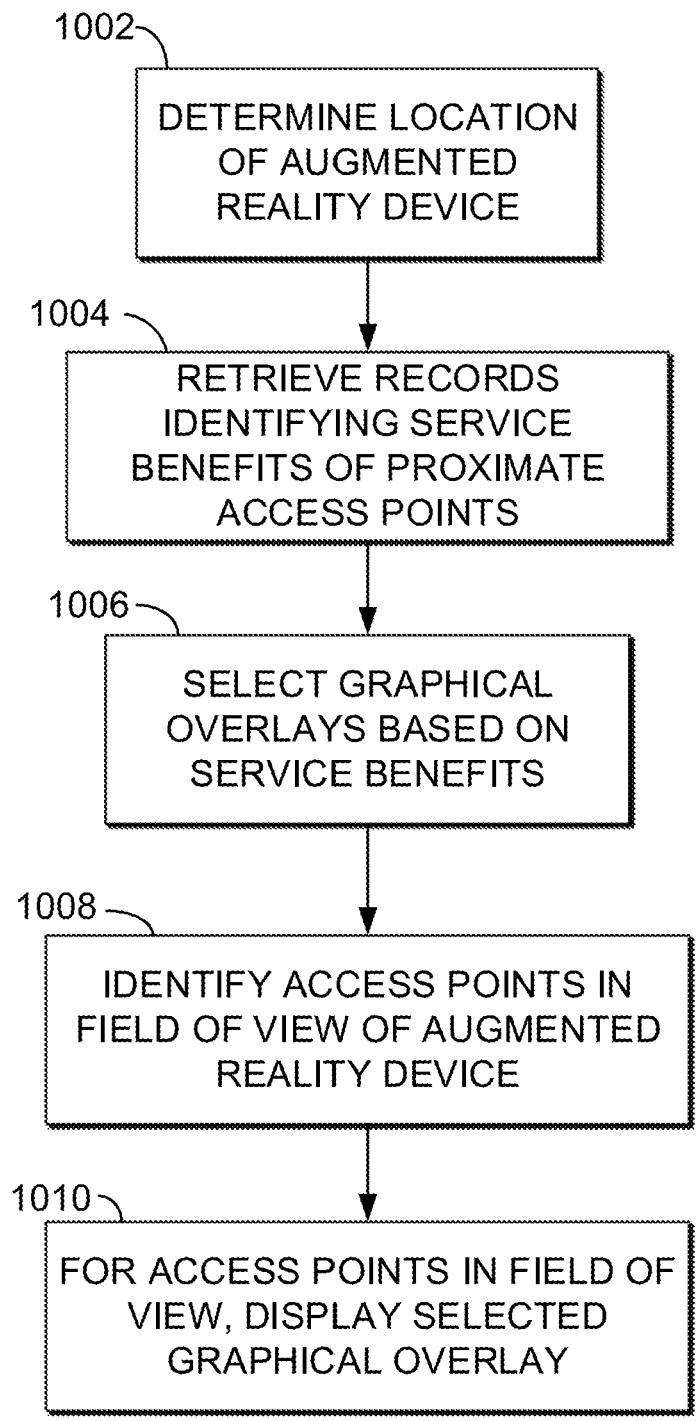
FIG. 10 is a flow chart of an exemplary method.

FIG. 10 illustrates an exemplary method that may be performed by an augmented reality display device in some embodiments. In step 1002, a location of the augmented reality display device is determined, e.g. using GPS circuitry or other techniques. In step 1004, the device operates to retrieve (e.g. from a remote server) records relating to proximate wireless network access points (e.g. access points within a threshold distance of the augmented reality device). In some embodiments, the record for each access point (e.g. for a first access point, a second access point, etc.) identifies (i) at least one service benefit provided by a content provider at the that network access point and (ii) a region in which a signal from the first access point is expected to be available. In step 1006, properties of a graphical overlay are selected based on the service benefit. For example, the textual content, the color, the color saturation, the opacity, or other property of each overlay may be selected. In step 1008, the display device determines for each of the access points whether at least a portion of the corresponding region is within a current field of view of the augmented reality display device. In step 1010, the augmented reality display device displays a graphical overlay for each of the regions within the field of view, where the display properties of each graphical overlay have been selected based on the service benefit. The displayed properties of the graphical overlays thus provide indications of one or more service benefits that may be available at the respective access points.

In some alternative embodiments, the information collected regarding network-level quality, regions of expected signal availability, and the presence (or absence) of particular service benefits available through different access points may be displayed in a two-dimensional map format rather than an augmented reality display. The two-dimensional map display may be made accessible electronically for the benefit of users who may not have access to an augmented reality display. Such a map may be displayed using, for example, a desktop or laptop computer. Regions of the map in which a signal is expected to be available for a particular access point may be colored in using a color selected based on a service benefit available at that access point.

Figure 11:
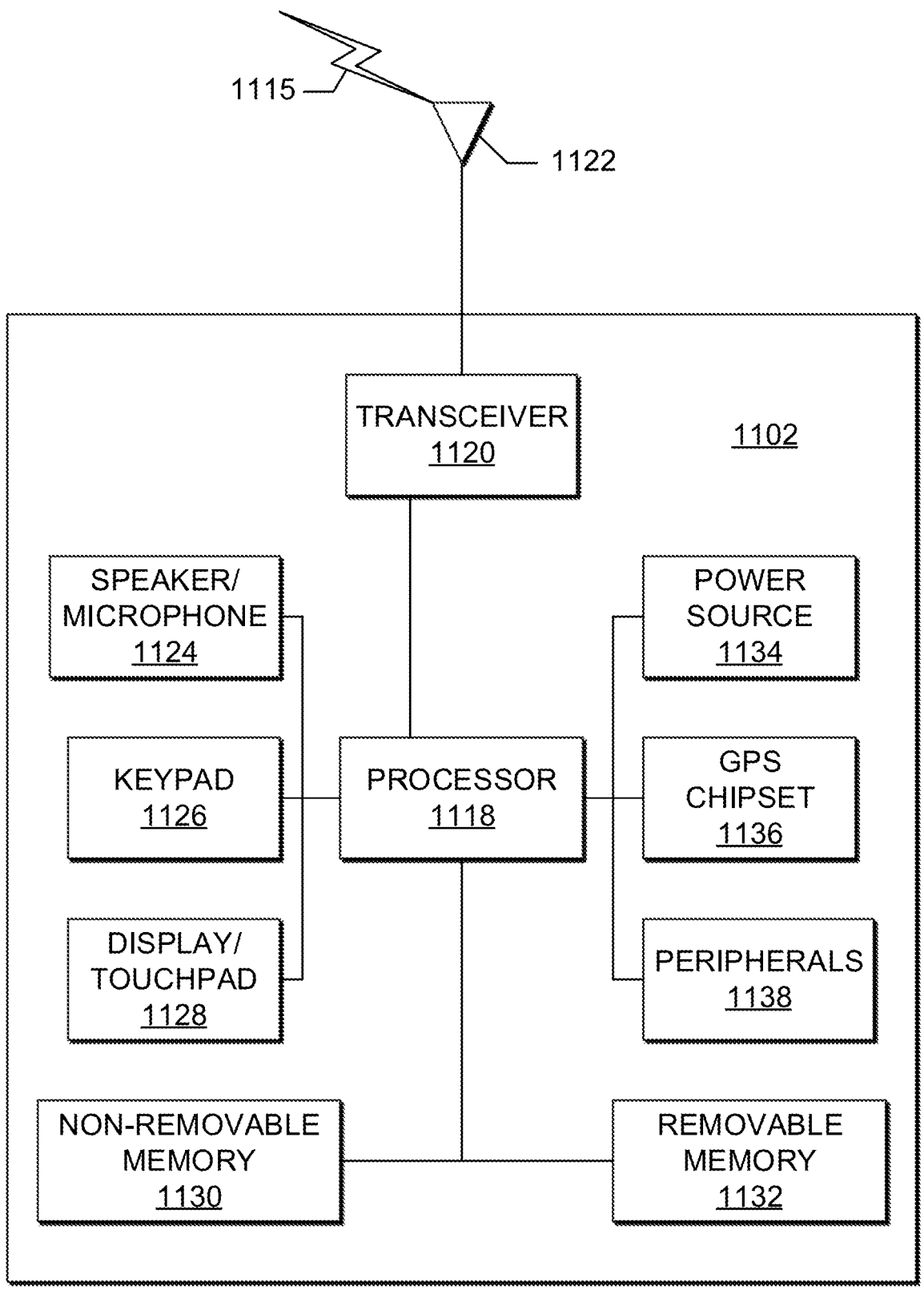
FIG. 11 is a functional block diagram of an exemplary wireless transmit receive unit, in accordance with an embodiment.

In some embodiments, a mobile device taking the form of a wireless transmit-receive unit (WTRU) may be used as an augmented reality display device to carry out the above-mentioned methods. FIG. 11 depicts an exemplary WTRU. As shown in FIG. 11, the WTRU 1102 may include a processor 1118, a transceiver 1120, a transmit/receive element 1122, audio transducers 1124 (preferably including at least two microphones and at least two speakers, which may be earphones), a keypad 1126, a display/touchpad 1128, a non-removable memory 1130, a removable memory 1132, a power source 1134, a global positioning system (GPS) chipset 1136, and other peripherals 1138. It will be appreciated that the WTRU 1102 may include any sub-combination of the foregoing elements while remaining consistent with an embodiment. The WTRU may communicate with nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The transmit/receive element 1122 may be configured to transmit signals to, or receive signals from, a node over the air interface 1115. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, as examples. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11 as a single element, the WTRU 1102 may include any number of transmit/receive elements 1122. More specifically, the WTRU 1102 may employ MIMO technology. Thus, in one embodiment, the WTRU 1102 may include two or more transmit/receive elements 1122 (e.g., multiple antennas) for transmitting and receiving wireless signals over the air interface 1115.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, as examples.

The processor 1118 of the WTRU 1102 may be coupled to, and may receive user input data from, the audio transducers 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. As examples, the power source 1134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1118 may also be coupled to the GPS chipset 1136, which may be configured to provide location information (e.g., longitude and latitude) regarding the current location of the WTRU 1102. In addition to, or in lieu of, the information from the GPS chipset 1136, the WTRU 1102 may receive location information over the air interface 1115 from a base station and/or determine its location based on the timing of the signals being received from two or more nearby base stations. It will be appreciated that the WTRU 1102 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, an AR HMD, and the like.

Figure 12:
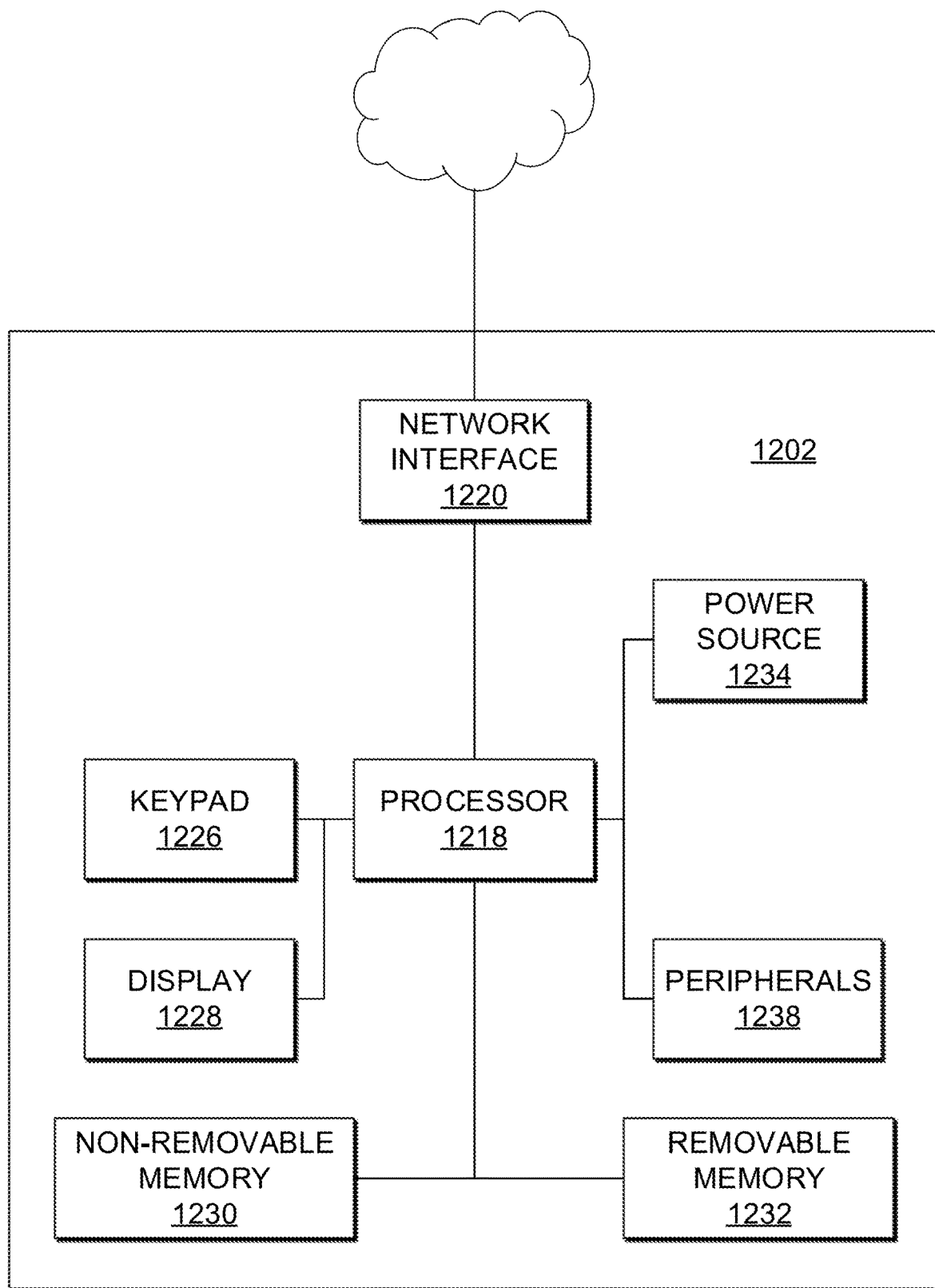
FIG. 12 is a functional block diagram of an exemplary networked computer, in accordance with an embodiment.

In some embodiments, systems and methods described herein may be implemented in a networked server, such as server 1202 illustrated in FIG. 12. For example, the server 1202 may be used to implement the database 108 of FIG. 1. As shown in FIG. 12, the server 1202 may include a processor 1218, a network interface 1220, a keyboard 1226, a display 1228, a non-removable memory 1230, a removable memory 1232, a power source 1234, and other peripherals 1238. It will be appreciated that the server 1202 may include any sub-combination of the foregoing elements while remaining consistent with an embodiment. The server may be in communication with the internet and/or with proprietary networks.

The processor 1218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the server 1202 to operate in a wired or wireless environment. The processor 1218 may be coupled to the network interface 1220. While FIG. 12 depicts the processor 1218 and the network interface 1220 as separate components, it will be appreciated that the processor 1218 and the network interface 1220 may be integrated together in an electronic package or chip.

The processor 1218 of the server 1202 may be coupled to, and may receive user input data from, the keyboard 1226, and/or the display 1228 (e.g., a liquid crystal display (LCD) display unit or organic light-emitting diode (OLED) display unit). The processor 1218 may also output user data to the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. In other embodiments, the processor 1218 may access information from, and store data in, memory that is not physically located at the server 1202, such as on a separate server (not shown).

The processor 1218 may receive power from the power source 1234, and may be configured to distribute and/or control the power to the other components in the server 1202. The power source 1234 may be any suitable device for powering the server 1202, such as a power supply connectable to a power outlet.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by an augmented reality (AR)-capable device of a user, the method comprising:
   determining a current location and a viewing orientation of the AR-capable device;
   querying a database based on the determined current location to retrieve data describing an attribute of a network as a function of space in a real-world area in the viewing orientation of the AR-capable device;
   generating from the data a 3D visualization of the network attribute as a function of space registered to the real-world area; and
   displaying the 3D visualization.

2. The method of claim 1, wherein the network attribute comprises a signal strength of the network.

3. The method of claim 1, wherein the network attribute comprises a bandwidth of the network.

4. The method of claim 1, wherein the network attribute comprises a cost associated with accessing or using the network.

5. The method of claim 1, wherein the network attribute is selected from the group consisting of service set identifier, network service provider, and service benefit.

6. The method of claim 1, wherein the data describing the network attribute is crowd-sourced.

7. The method of claim 1, wherein displaying the 3D visualization comprises displaying the 3D visualization as a graphical overlay on top of a camera view from the AR-capable device.

8. The method of claim 1, wherein the 3D visualization comprises different levels of opacity representing different levels of the network attribute.

9. The method of claim 1, wherein the 3D visualization comprises different levels of color saturation representing different levels of the network attribute.

10. The method of claim 1,
    wherein the 3D visualization comprises different levels of a graphical attribute representing different levels of the network attribute, and
    wherein the graphical attribute is selected from the group consisting of color, texture, size, shape, and ornamentation.

11. The method of claim 1, wherein displaying the 3D visualization comprises displaying a 3D perspective rendering of a spatial volume registered to a region in the real-world area, and wherein the method further comprises:
    determining whether at least a portion of the region is within a current field of view of the AR device,
    wherein displaying the spatial volume is performed only after determining that at least a portion of the region is within the current field of view.

12. The method of claim 1,
    wherein displaying the 3D visualization comprises displaying a graphical overlay registered to a region in the real-world area,
    wherein the graphical overlay indicates a service benefit provided by a content provider at a network access point.

13. The method of claim 1, wherein generating the 3D visualization of the network attribute comprises:
    selecting a region in the real-world area in which the data indicates the network attribute is above a threshold; and
    generating the 3D visualization of the network attribute for the selected region.

14. The method of claim 13, further comprising filtering the data corresponding to a user setting of the threshold.

15. The method of claim 1, further comprising:
    obtaining data describing a user rating of the current location; and
    displaying a graphical overlay corresponding to the data describing the user rating of the current location.

16. The method of claim 1, further comprising:
    determining a second location of the AR-capable device;
    measuring the network attribute at the second location; and
    transmitting to the database the second location and the measured network attribute at the second location.

17. The method of claim 16, wherein determining, measuring, and transmitting occur prior to determining the current location of the AR-capable device.

18. An augmented reality (AR)-capable device comprising:
    a processor; and
    a non-transitory computer readable medium storing instructions operative, when executed by the processor, to:
      determine a current location and a viewing orientation of the AR-capable device;
      query a database based on the determined current location to retrieve data describing an attribute of a network as a function of space in a real-world area in the viewing orientation of the AR-capable device,
      generate from the data a 3D visualization of the network attribute as a function of space registered to the real-world area; and
      display the 3D visualization.

19. The device of claim 18, further comprising an augmented reality display.

20. A method comprising:
    determining a current location of an AR-capable device and a current orientation of the AR-capable device at the current location;

querying a database based at least on the determined current location to retrieve data describing an attribute of a network as a function of space in a real-world area proximate to the current location;

determining that a portion of the real-world area is within a current field of view of the AR-capable device based at least in part on the current orientation of the AR-capable device;

displaying a 3D visualization of the network attribute in the current field of view;

measuring a change in the current orientation of the AR-capable device;

regenerating the 3D visualization of the network attribute consistent with the change in the current orientation of the AR-capable device; and displaying the regenerated 3D visualization.

* * * * *